Aug. 21, 1934.    O. FEUSSNER    1,971,215
APPARATUS FOR TESTING BY SPECTRUM ANALYSIS
Filed April 19, 1932
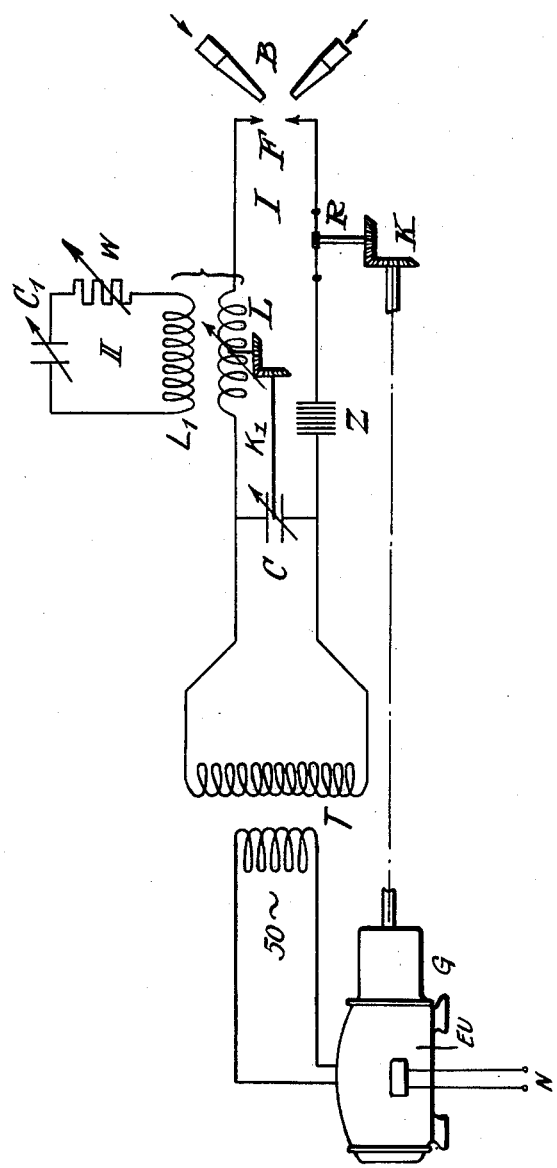
Inventor:
Otto Feussner
by Williams, Bradbury,
McCaleb & Hinkle
Attys.

Patented Aug. 21, 1934

1,971,215

UNITED STATES PATENT OFFICE 1,971,215

APPARATUS FOR TESTING BY SPECTRUM ANALYSIS

Otto Feussner, Hanau, Germany, assignor to W. C. Heraeus, Gesellschaft mit beschrankter Haftung, Hanau, Germany Application April 19, 1932, Serial No. 606,133
In Germany April 18, 1931

5 Claims. (Cl. 250—1)

During recent years physical methods for ascertaining the composition of various substances have become more and more of importance. This holds especially true, to an ever increasing extent, with methods of ascertaining the composition of alloys on the basis of their physical properties.

The optical rays which are commonly used for purposes of spectrum analysis are generated in the far greatest part of cases by emanation from electric spark-discharges, especially by producing arcs or sparks between the material to be tested.

It is known since a long time that the mode of generating the sparks between specimens of the material to be tested has a fundamental influence upon the character of the generated spectrum. On the other hand, up to the present time, there is no knowledge regarding any kind of apparatus which would permit to invariably obtain a spectrum of the same character, if the specimens to be tested are not much different from each other as regards composition. Heretofore, solely arc or spark spectra have been spoken of—which is lacking proper distinction—and distinction has heretofore only been made in so far as the spark has been designated as being a so-called condensed spark with the meaning of implying that a condenser of appreciable capacity had been used for generating the spark.

The now following statements relate in the first place to the generation of sparks for the aforementioned testing of specimens of materials by spectrum analysis and deal especially with the conditions which must be fulfilled in order to attain a uniform and always reproducible emission of the rays to be tested. The optical conditions as well as the mode of controlling the spectrum by modifications of the apparatus used during the test do not form part of my present invention.

I have found that in devising apparatus for generating reproducible spark discharges, such as are necessary for testing materials by spectrum analysis, the fact should be kept in mind that the higher the temperature of the spark discharge, the more the spectrum will resemble that produced by a spark and the higher will be the necessary current for production of the spark. In order to obtain reproducible spark discharges I have further found that it is necessary to keep the current strength of the spark always at a like value with like operating connections of the generator. Furthermore, the frequency of the oscillations of each spark discharge must always be the same. These conditions are fulfilled according to my invention in that the ratio between capacity and self-induction of the generating circuit is not made variable at will but caused to assume definite and exactly fixed values. If the first condition is fulfilled, the charge stored up in the condensers will discharge through the spark in a time which is fixed by the frequency or wave-length of the oscillations in the oscillating circuit. The smaller this time the higher will be the current strength, and the larger the capacity the higher will likewise be the current strength during the discharge. A further condition is that the voltage at the condensers is constantly maintained at the same value with the result of maintaining the charge of the condensers at the same value which may be measured in coulombs. The aforementioned constant voltage at the condensers is attained by my invention by controlling the discharges, the apparatus used for this purpose consisting either of resonance producing devices in the low-frequency circuit or better of a rotating interrupter which in case of available direct current is driven by a rotary converter and in case of available alternating current by a synchronous motor. The second spark-gap obtained in this manner serves simultaneously for properly reducing the inevitable variations in the distance between the electrodes forming the spark-gap for the reception of the specimens to be tested by increasing the effective length of the path of the spark. I further prefer to make use of a third spark-gap which may consist of a plurality of individual spark-gaps in which case the first spark-gap serves for the reception of the specimens to be tested by spectrum analysis, the second spark-gap for generating a discharge of definite character as regards voltage, number of sparks and phase position, while the third and, if desired, further spark-gaps are used for quenching the spark in the manner as it is done in Wien's quenched spark-gap.

In accordance with this my new apparatus for spectrum analysis, beside the spark-gap which contains the specimens to be tested, comprises other electrical devices which serve for regulating the number and phase position of the spark discharges.

According to my invention I provide another improvement which consists of additional electrical devices adapted to fix the moment of each individual spark discharge. A further improvement according to my invention consists in the provision of further electrical devices adapted to selectively vary the moments of the discharge of subsequent sparks.

A still further improvement consists according to my invention in the provision of means permitting variation of the ratio between capacity and self-induction only in such a manner that upon increase of the capacity there will be a decrease of self-induction and vice versa, in order to maintain the wave-length of the generated high-frequency currents at an approximately constant value.

In the accompanying drawing I have represented an example of my new apparatus for spectrum analysis in the form of a diagram showing the mode of connection between the several electrical devices and the general apparatus for spectrum analysis. According to the drawing I make use of alternating current obtained through a rotary converter EU from a source of direct current N, said alternating current serving to charge the condenser C or a bank of condensers by way of a high-voltage transformer T, the frequency of the alternating current being assumed as 50 cycles per second. In the drawing I is a primary and II a secondary oscillating circuit coupled to the former by a transformer with the primary and secondary coils L, L₁ an air-gap being interposed between said coils. Charging of the condensers is continued until the electrodes F which consist of a specimen of the material to be tested by spectrum analysis are short-circuited by a spark-discharge. In consequence of this spark-discharge high-frequency oscillations will be set up in said primary circuit I including the condenser C, the primary coil L, the electrodes F and the aforementioned interrupter R which is driven in synchronism with the alternating current supplied to the transformer T.

If the transformer T is supplied from a source of direct current N through a rotary converter E U as shown in the drawing the interrupter R may be driven by said rotary converter E U for instance as shown by a gear G connected to the rotary converter E U and bevel gear K connected therewith, to be in synchronism with the alternating current supplied to the transformer T, or if an alternating current source is available the transformer T may be directly supplied and the interrupter R driven from this source by means of a synchronous motor.

Prior to the spark-discharge between the electrodes F a certain charge of electricity which may be measured in coulombs had been stored up in the condensers, the current strength of the spark-discharge between the electrodes F being determined by the frequency of said discharge. Under conditions which are alike in other respects the current strength in the spark-discharge increases with the voltage at the condensers and accordingly the current strength in a subsequent spark-discharge will likewise be larger. Practically, however, it is hardly possible to control or regulate the discharge so as to have, for instance, only one or a definite number of discharges per half-wave. This is due to the fact that without insertion of special control organs the number of discharges as well as the voltage at the electrodes will greatly vary which is a source of a certain lack of constancy of electrical conditions. This lack of constancy of electrical conditions is avoided according to my invention by inserting electrical devices, for instance, resonance producing devices which are able to determine the number of discharges as well as the phase position of the spark. Devices of this kind, however, cannot always be conveniently attended and, in addition, do not provide any safety of operation. I, therefore, provide a mechanical and positive control device, for instance, in the form of the above-mentioned synchronously rotated interrupter R. When a source of direct current N is available, as above-mentioned, a rotary converter E U may be used as shown in the drawing, this surplus of apparatus being quite negligible as compared with an available source of alternating current. The interrupter R is preferably inserted into the primary oscillating circuit I at the place shown in the drawing to permit control of the voltage between the electrodes F and therewith of the current strength of the high-frequency oscillations. The interrupter R is necessary in order to exactly fix the moment of the spark-discharge. Without said interrupter the spark-discharge would solely be determined by the spark-gaps and accordingly be greatly dependent upon incidental conditions. In addition, without employment of said interrupter several discharges are liable to be produced during the same half-wave, which should be positively prevented in view of the insufficiency of the charge of the condensers in this case. Although with an interrupter for direct current the number of discharges may widely be determined by the number of interruptions, this will not maintain with certainty a constant voltage at the electrodes F in all cases. In view of this I provide further improvements, which are theoretically based on the following.

The amount of vapor developed at the electrodes increases with the current strength of the spark-discharge and in like manner increases the temperature of the vapor. With increasing vapor temperature the character of the spectrum will become more similar to the spark spectrum proper, that is the spectrum is generally richer in lines. The prevailing opinion that the spark character of the spectrum is due to the higher voltage at the electrodes is probably not correct, because frequently there will be temperatures of 10,000° and more at a current strength of more than 100 amperes per square-millimeter, as compared with a temperature of about 5,000°–6,000° in a spark-discharge which is of the character of an arc. On account of this the constancy of the electrode voltage which produces the spark-discharge is all the more of importance for exact testing by spectrum analysis.

As has been mentioned above, the current strength of the oscillations at a constant value of capacity is determined by the frequency of the discharge. From the formula $$2\pi n = \omega = \frac{1}{\sqrt{L.C}},$$

wherein $n$ designates the frequency, and $\omega$ the circular frequency or angular velocity, it may be seen that the product of the capacity C and the self-induction L determines the value of $\omega$. As the fact that the spectrum is widely independent from the frequency appears to be ascertained, the frequency is of no importance in this respect. The frequency, however, becomes important in view of the fact that the current strength of the discharge and therewith also the temperature of the metal vapor produced at the electrodes increases with increasing frequency at constant capacity. This is of greatest influence upon the character of the spectrum. In other words it may be said that at constant frequency of the discharge the current strength is small and consequently the temperature of the discharge is low (arc spectrum), if the self-induction overpowers the capacity, while in the opposite case of the capacity overpowering the self-induction the temperature of the generated vapor is high (spark spectrum). It may be again pointed out that in carrying out tests by spectrum analysis special care must be taken to have a proper ratio between capacity and self-induction which mainly determines the current strength and the temperature of the vapor emitted by the electrodes.

In the following I desire to mention some observations of practical importance and further improvements derived from these observations. The high frequency oscillations set up in the circuits shown in the drawing are damped oscillations. In case of sufficient current strength the first oscillation is pronouncedly of the character of a spark-discharge, while the later oscillations are of the character of an arc-discharge, a proper stage of transit being observed between the first and the later oscillations. However, greater or smaller damping of the oscillations will hardly have an effect upon the character of the generated spectrum, as the ratio between the initial and the final frequency is little affected by damping.

On the other hand it must be kept in mind that even by heavy blowing it is not possible to remove the vapor generated by the first high-frequency half-wave before the arrival of the second half-wave which generates vapor at the other electrode. Also, during the third and subsequent half-waves the gas between the electrodes is in a practically unchanged condition.

In consequence of this, the light of the second, third and subsequent half-waves must pass through the previously generated vapor in order to be carried towards the apparatus proper for the spectrum analysis. This passage of light through vapor will naturally give rise to a variety of conditions, such as absorptions, reversals and so forth and it is therefore necessary to take precautions in conveniently arranging the apparatus to permit a proper control thereof.

This may be accomplished according to my invention by providing the aforementioned second oscillating circuit II including the self-induction coil L₁ which forms the secondary of the transformer with the self-induction coil L as primary variable damping means W being inserted in the secondary circuit II. As the secondary circuit II is in resonance with the primary circuit I, the former will very quickly withdraw the energy from the latter with the result of causing the high-frequency oscillations to die out. This arrangement is similar to that which had formerly been used in wireless telegraphy under the name of shock-excitation with quenched spark. It will be possible without great difficulties to fully suppress the oscillations in the main or primary oscillating circuit I after at most three half-waves and to annihilate the energy in the secondary oscillating circuit II which is coupled to said main or primary circuit without in any way reacting upon the latter circuit. Suppression of the oscillations may be supplemented by using an additional spark-gap Z which is especially constructed to act in the manner of a spark-gap with a quenched discharge. The use of this second spark-gap is quite of considerable influence upon the suppression of the oscillations; in addition to the use of the spark-gap Z I further propose to blow an inert gas or air through the gap between the electrodes by means of any suitable blowing device such as shown in the drawing at B, to prevent as much as possible collection of the ordinarily produced absorbing vapors and compounds. The light emitted from the vapor should pass as much as possible unaffected into the apparatus proper for spectrum analysis. To use hydrogen for this purpose is not to be recommended, as hydrogen has considerable absorbing properties within the narrower band of the ultra-violet region of the spectrum.

It may further be mentioned in which way the arrangement of the electrodes has an effect upon the operation of the apparatus. Heretofore electrodes between which the spark-discharge takes place have been almost invariably mounted one vertically above the other. The spark which discharges between the electrodes will develop considerable quantities of vapor at its contact with the electrode which momentarily forms the cathode. Reference has been made above regarding the dependence of these quantities of vapor upon the conditions of discharge. The light emitted from this vapor is conveyed, sometimes through suitable condensing lenses, towards the apparatus proper for spectrum analysis. The shape of the developed vapor resembles that of minute candle-flames or torch-flames and in the following such or similar terms are used for designating the formation of the developed vapor. The temperature in the several parts of these torch-flames are naturally different and greatest at the interior zone of the flame, while decreasing towards the periphery. The highest temperature presumably prevails in the immediate vicinity of the point of contact of the spark-discharge with the electrodes. As the temperature of the metal vapor has a great influence upon the intensity of the emitted wave-lengths, it will be immediately possible to essentially change the spectrum by dazzling certain parts of the flames of vapor. In the usual arrangement of apparatus of this kind such dazzling takes very frequently place in a manner which is quite out of control as the flames of vapor seldom co-incide with the straight line of connection between the two electrodes and mostly deflect more or less towards the outside. As seen in a direction from the spectrograph, in the present case the opaque fixed electrodes will act in the manner of blinds with the effect that only a varying amount of the light of the vapor-flames becomes effective in the spectrograph. It is evident that by this the character of the spectrum may be varied to the widest possible extent. During carrying out tests by spectrum analysis care must be taken that the light of all parts of the vapor-flames be positively carried into the spectrograph.

An inert gas or air may be blown into the gap between the electrodes only in case excessive heating of the latter is to be feared. Beside the fact that the intensity of several lines of the spectrum may be changed in a purely optical way by absorption due to the presence of metal vapor between the electrodes, there is the further possibility of causing such gases, owing to the spark passing therethrough, to emit light anew, similar to metal vapor lamps, thus affecting the appearance of the spectrum. As the conditions as regards emission of light are in this case extremely variable, it will rarely be possible to attain a spectrum which is suitable for reproduction. On the contrary, it appears to be absolutely necessary to remove as quickly as possible the vapor formed during the spark-discharges between the electrodes by blowing an inert gas or air into the spark-gap for the purpose of causing each subsequent discharge and emission of light to take place under conditions which are exactly in agreement with the conditions of the preceding discharge.

With my present apparatus for carrying out tests by spectrum analysis excellent reproduceable conditions of discharge may be brought about, especially if the apparatus is operated in the above explained manner permitting to produce spectra which are reproduceable to the greatest possible extent and which may be advantageously used for the purpose of spectrum analysis.

I claim:

1. Apparatus for carrying out tests by spectrum analysis, said apparatus comprising a primary oscillating circuit including a spark-gap adapted for the reception of a specimen of the material to be tested, capacity and self-induction in said primary oscillating circuit, a secondary oscillating circuit coupled with said primary circuit, damping means included by said secondary circuit and adapted to annihilate the electrical energy in said primary circuit to convey the light emitted by said spark-gap always through like quantities of vapor therein.

2. Apparatus for carrying out tests by spectrum analysis, said apparatus comprising a spark-gap for the reception of a specimen of the material to be tested, a circuit including said spark-gap a resonant circuit including a self-inductance and a capacity connected to said spark-gap, and means to vary said self-inductance and said capacity oppositely to maintain the resonant wavelength of said resonant circuit approximately at a constant value.

3. Apparatus for carrying out tests by spectrum analysis, comprising a spark gap for the reception of the material to be tested, a transformer, means for connecting the primary thereof in circuit with a rotating alternating current generator, means for connecting the secondary thereof in circuit with a second spark gap and an interrupter connected in series with said first-mentioned spark gap, and means for rotating said interrupter synchronously with said rotating generator, so as to permit adjustment and regulation of the frequency and phase-position of spark-discharges in said first mentioned spark gap.

4. Apparatus for producing spark discharges for use in spectrum analysis, comprising an oscillation system including a spark gap adapted for the reception of a specimen of the material to be tested, means for generating discharges in the gap and maintaining constancy of voltage in the discharges, and means for absorbing and rapidly destroying the energy of the discharges.

5. Apparatus for producing spark discharges for use in spectrum analysis, comprising a spark gap adapted for the reception of a specimen of the material to be tested, a primary oscillating circuit for generating discharges in the gap, said circuit including means for maintaining constancy of condenser voltage in the spark discharge, and a secondary oscillating circuit coupled with the primary circuit for absorbing and rapidly destroying the energy of the discharges.

OTTO FEUSSNER.